(12) United States Patent
Penning et al.

(10) Patent No.: US 10,899,111 B2
(45) Date of Patent: Jan. 26, 2021

(54) PROCESS FOR PRODUCING A POLYMER-COATED METAL STRIP AND A POLYMER-COATED METAL STRIP PRODUCED THEREBY

(71) Applicant: TATA STEEL IJMUIDEN B.V., Velsen-Noord (NL)

(72) Inventors: Jan Paul Penning, The Hague (NL); Daniel Roy Oosterman, Akersloot (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 142 days.

(21) Appl. No.: 16/082,671

(22) PCT Filed: Mar. 21, 2017

(86) PCT No.: PCT/EP2017/056618
§ 371 (c)(1),
(2) Date: Sep. 6, 2018

(87) PCT Pub. No.: WO2017/174345
PCT Pub. Date: Oct. 12, 2017

(65) Prior Publication Data
US 2019/0091969 A1 Mar. 28, 2019

(30) Foreign Application Priority Data
Apr. 4, 2016 (EP) ..................................... 16163683

(51) Int. Cl.
*B32B 15/09* (2006.01)
*B32B 27/32* (2006.01)
(Continued)

(52) U.S. Cl.
CPC ................ *B32B 15/09* (2013.01); *B32B 7/02* (2013.01); *B32B 7/12* (2013.01); *B32B 15/08* (2013.01);
(Continued)

(58) Field of Classification Search
None
See application file for complete search history.

(56) References Cited

U.S. PATENT DOCUMENTS 3,594,254 A * 7/1971 Lemelson ............. B29C 59/046
156/384
5,234,516 A * 8/1993 Okamura ................ B32B 15/08
156/82

(Continued)

FOREIGN PATENT DOCUMENTS

CN        1032763 A      5/1989
CN      104540673 A      4/2015
(Continued)

OTHER PUBLICATIONS

International Search Report and Written Opinion dated Jun. 2, 2017 for PCT/EP2017/056618 to Tata Steel Ijmuiden B.V. filed Mar. 21, 2017.
(Continued)

*Primary Examiner* — Tae H Yoon
(74) *Attorney, Agent, or Firm* — Vorys, Sater, Seymour and Pease LLP

(57) ABSTRACT

A process for producing a laminate in a coating line including the subsequent steps of: —providing a metal strip; —pre-heating the metal strip to a temperature of at least 100° C.; —producing a laminate by adhering a first thermoplastic polymer coating layer on one major surface of the strip and a second thermoplastic polymer coating layer on the other major surface of the strip wherein the first ther- (Continued)

moplastic polymer coating layer includes a polymer with a melting point below 200° C.; —heating the laminate in a non-oxidising gas atmosphere in a post-heating step to at least the melting point of the polymer or polymers in the second polymer coating layer, and at least 220° C.; —rapidly cooling or quenching the laminate to a temperature of below 50° C. Also, a polymer coated metal strip produced thereby, or a can produced therefrom.

21 Claims, 4 Drawing Sheets

(51) Int. Cl.
| | |
|---|---|
| *B32B 27/34* | (2006.01) |
| *B32B 27/36* | (2006.01) |
| *B32B 37/15* | (2006.01) |
| *B32B 37/20* | (2006.01) |
| *B32B 15/085* | (2006.01) |
| *B32B 15/08* | (2006.01) |
| *B32B 27/08* | (2006.01) |
| *B32B 15/18* | (2006.01) |
| *B32B 7/12* | (2006.01) |
| *B32B 7/02* | (2019.01) |
| *B32B 15/088* | (2006.01) |

(52) U.S. Cl.
CPC .......... *B32B 15/085* (2013.01); *B32B 15/088* (2013.01); *B32B 15/18* (2013.01); *B32B 27/08* (2013.01); *B32B 27/32* (2013.01); *B32B 27/34* (2013.01); *B32B 27/36* (2013.01); *B32B 37/153* (2013.01); *B32B 37/206* (2013.01); *B32B 2250/03* (2013.01); *B32B 2250/40* (2013.01); *B32B 2255/06* (2013.01); *B32B 2255/205* (2013.01); *B32B 2307/308* (2013.01); *B32B 2307/54* (2013.01); *B32B 2309/66* (2013.01); *B32B 2311/00* (2013.01); *B32B 2311/30* (2013.01); *B32B 2439/66* (2013.01); *B32B 2439/70* (2013.01)

(56) References Cited

U.S. PATENT DOCUMENTS

| | | | |
|---|---|---|---|
| 5,238,517 A * | 8/1993 | Heyes | ............... B32B 15/08 118/400 |
| 9,186,875 B1 | 11/2015 | Loen et al. | |
| 9,346,254 B2 * | 5/2016 | Penning | ............... B32B 15/082 |
| 2014/0238601 A1 | 8/2014 | Loen et al. | |
| 2015/0037604 A1 | 2/2015 | Penning et al. | |

FOREIGN PATENT DOCUMENTS

| | | |
|---|---|---|
| EP | 0312302 A1 | 4/1989 |
| WO | 8903301 A | 4/1989 |
| WO | 9852750 A1 | 11/1998 |
| WO | 2012045791 A1 | 4/2012 |
| WO | 2014079909 A1 | 5/2014 |
| WO | 20140479910 A1 | 5/2014 |

OTHER PUBLICATIONS

"Polymer Handbook", J. Brandrup, E. H. Immergut and E. A. Grulke eds., Wiley Interscience, 4th ed (1999), Section VI, Table 7.
Zhang Banghua et al, Modern High-Molecule Science, p. 433-435, Chemical Industry Press, 1st Edition in Jan. 2006.
Office Action dated Jun. 12, 2020 from Chinese Patent Application No. 201780019787.8 to Tata Steel Ijmuiden BV.

* cited by examiner

| Standards | |
| --- | --- |
| Tinplate and ECCS (TFS) | Blackplate |
| Euronorm 10202 | Euronorm 10205 |
| ASTM 623 (on request) | |

Figure 4a

Mechanical properties

| | Special | AISI/ASTM | BA/CA | SR/DR | Yield/Proof strength (MPa) | Tensile strength (MPa) | Range (MPa) |
|---|---|---|---|---|---|---|---|
| TS200 | Bake ware and extreme deformations | | BA | SR | 200 | 320 | +/- 50 |
| TS230* | | T1 | BA | SR | 230 | 325 | +/- 50 |
| TS245* | | T2 | BA | SR | 245 | 340 | +/- 50 |
| TS260* | | | BA | SR | 260 | 360 | +/- 50 |
| TS275* | | T3 | BA | SR | 275 | 375 | +/- 50 |
| TS290* | | | BA | SR | 290 | 390 | +/- 50 |
| TS345 | Aerosol components | | BA | DR | 345 | 400 | +/- 50 |
| TS480 | More formable DR grade | | BA | DR | 480 | 505 | +/- 50 |
| TS520 | Formable DR Grade | DR 7.5 | BA | DR | 520 | 545 | +/- 50 |
| TS550* | | DR 8 | BA | DR | 550 | 575 | +/- 50 |
| TH415* | | T4 | CA | SR | 415 | 435 | +/- 50 |
| TH435* | | T5 | CA | SR | 435 | 460 | +/- 50 |
| TH465N | Easy open ends | T5 | CA | SR | 465 | 495 | +/- 50 |
| TH465 | Sanitary ends | | CA | DR | 465 | 480 | +/- 50 |
| TH480 | Easy open and sanitary ends | | CA | DR | 480 | 500 | +/- 50 |
| TH520* | | DR 7.5 | CA | DR | 520 | 540 | +/- 50 |
| TH550* | | DR 8 | CA | DR | 550 | 570 | +/- 50 |
| TH550N* | Easy open ends | DR 8 | CA | DR | 550 | 560 | +/- 50 |
| TH580* | | | CA | DR | 580 | 590 | +/- 50 |
| TH620* | | DR 9 | CA | DR | 620 | 625 | +/- 50 |

* Euronorm designation

PROCESS FOR PRODUCING A POLYMER-COATED METAL STRIP AND A POLYMER-COATED METAL STRIP PRODUCED THEREBY

CROSS-REFERENCE TO RELATED APPLICATIONS

This is a § 371 National Stage Application of International Application No. PCT/EP2017/056618 filed on Mar. 21, 2017, claiming the priority of European Patent Application No. 16163683.2 filed on Apr. 4, 2016.

FIELD OF THE INVENTION

This invention relates to a process for producing a polymer-coated metal strip and a polymer coated metal strip produced thereby.

BACKGROUND OF THE INVENTION

In the packaging industry the use of polymer-coated substrates is becoming more and more common in the production of cans. The polymer-coated substrate can be produced by extruding a molten polymer film directly onto the metallic substrate or by producing a thermoplastic polymer film that is subsequently laminated, as a solid film, onto a metallic substrate in an integrated or separate lamination process step.

Lamination is usually performed by leading the polymer film and the substrate through a lamination nip formed by two or more rolls pressing the coating onto the metallic strip. Alternatively processes such as extrusion coating or a combination of film casting and laminating can also be used. In these processes it is often necessary to apply a post-heat treatment or annealing treatment (jointly referred to as post-heat in this context) to the thermoplastic polymer coating after application of this coating. Preferably, such a post-heat treatment is conducted above the melting point of the highest melting polymer to completely melt the thermoplastic coating. By complete melting, excellent adhesion between the polymer and the metal substrate is achieved and other favourable properties of the polymer-metal laminate, such as formability and an attractive appearance, can be obtained. During the heat treatment, however, thermal degradation of the coating material may occur, which leads to an undesirable loss of coating properties, such as a loss in barrier properties, adhesion, formability, and appearance. In this context a metal strip provided with a polymer coating on one or both major surfaces is referred to as a laminate.

EP0312302-A1 discloses a process in which a metal strip is coated on one side with a thermoplastic polyester coating, and on the other side with a thermoplastic polyolefin coating. A well-known thermoplastic polyester coating material that is frequently employed in the coating of metals is poly(ethylene terephthalate) which has a melting point of about 260° C. The post-heat treatment of this type of coating typically involves temperatures in the range of 270-300° C. On the other hand, the thermal stability of polyolefins such as a polyethylene or polypropylene is limited to about 250° C., even at short exposure times. Thus, the post-heat treatment temperature required by the polyester coating leads to excessive degradation of the polyolefin coating.

SUMMARY OF THE INVENTION

It is an object of this invention to provide a process for manufacturing a metal strip that is coated on both sides with a thermoplastic polymer coating, including a post-heat treatment to achieve excellent adhesion, formability and appearance of the final product, while minimising the extent of thermal degradation of the polymer coating.

It is also an object of this invention to provide a process for manufacturing a metal strip that is coated on both sides with a thermoplastic polymer coating, where both coating sides have substantially different melting points, including a post-heat treatment to achieve excellent adhesion, formability and appearance of the final product, while minimising the extent of thermal degradation of the polymer coating One or more of these objects are reached with the process for producing a laminate in a coating line comprising the subsequent steps of:
 providing a metal strip;
 pre-heating the metal strip to a temperature of at least 100° C.;
 producing a laminate by adhering a first thermoplastic polymer coating layer on one major surface of the strip and a second thermoplastic polymer coating layer on the other major surface of the strip wherein the first thermoplastic polymer coating layer comprises or consists of a polymer with a melting point below 200° C.;
 heating the laminate in a non-oxidising gas atmosphere in a post-heating step to at least the melting point of the polymer or polymers in the second polymer coating layer, and to at least 220° C.;
 rapidly cooling or quenching the laminate to a temperature of below 50° C.

It should be noted that the term 'non-oxidising' is used in relation to the polymer or polymers comprised in the first and second polymer coating layer. The inventors found that the thermal degradation of the coating material that may occur during the post-heat after lamination can be prevented if the atmosphere in which the post-heat is performed contains little to no oxygen. The danger of thermal degradation is particularly present when the first coating layer comprises or consists of a polymer with a low melting point, and the second coating layer comprises or consists of a polymer which a considerably higher melting point. In order to achieve the desired properties of the laminate, such as excellent adhesion, formability and appearance, it is of importance that not only the first coating layer, but also the second coating layer having a higher melting point is completely melted in the post-heat treatment. After complete melting and rapid cooling or quenching, the degree of crystallisation of the second coating layer is preferably at most 20 wt. %, preferably at most 15 wt. %, more preferably at most 10 wt. %. By the method according to the invention the danger of thermal degradation is avoided, whilst still obtaining the low crystallinity in the second coating layer.

The fast cooling of the laminate after the post-heat is intended to prevent, at least partly, crystallisation of the molten polymers. The, at least part, amorphous polymer layer show improved adhesion to the substrate. The fast cooling may be achieved by leading the laminate after post-heat through a cooling device, which may be a water bath. In this way, for example, an amorphous structure is formed in a polyester or a minimal crystalline structure in a polyolefin. The cooling rate during quenching preferably is at least 100° C./s.

BRIEF DESCRIPTION OF THE DRAWINGS

FIG. 4 presents various types of packaging steels according to standards taken from the brochure "Steel for packaging applications - Product range & technical specifications" by Tata Steel (www.tatasteeleurope.com).

DETAILED DESCRIPTION OF THE INVENTION

Figure 1:
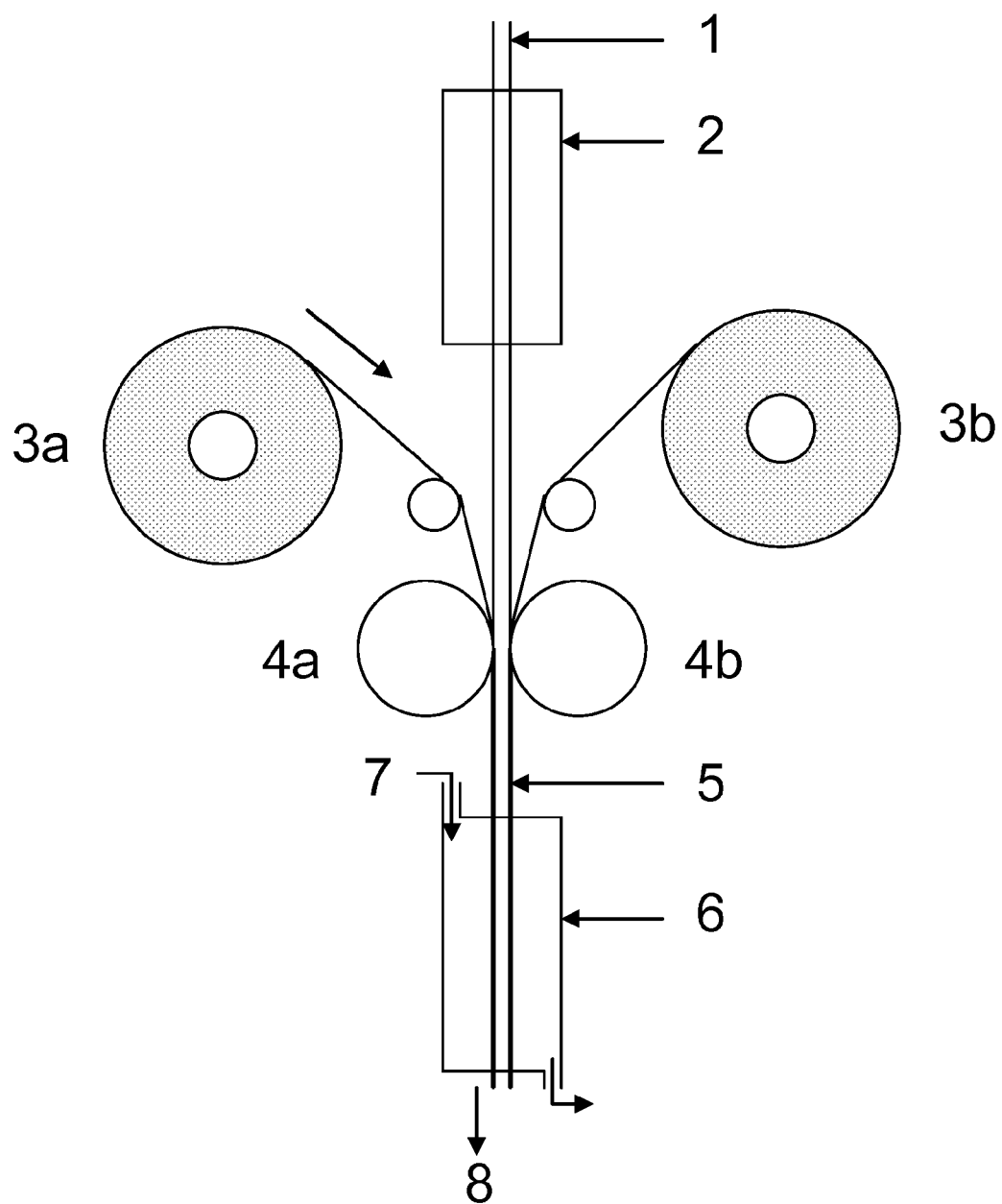
FIG. 1 schematically shows a process in which the PET and PP films are laminated to the steel strip.

In an embodiment of the invention the first polymer coating layer comprises or consists of a polyolefin layer or layers, or the first and second polymer coating layers comprises or consists of a polyolefin layer or layers. Polyolefins have a relatively low melting point. In addition, they are relatively susceptible to thermal degradation, and this danger may also occur if both sides of the metal strip are coated with a polyolefin. Polyolefins usually have a high molecular weight and as a result flow relatively sluggishly in the molten state. Consequently, the post-heat for polyolefins has to be considerably higher than their respective melting points, and a post-heat of at least 220° C. may be required. At these higher post-heat temperatures the flow behaviour of the polyolefins is greatly accelerated, and the non-oxidising atmosphere prevents thermal degradation. Thermal degradation leads to a reduction in molecular weight of the polyolefin and the porosity and sterilisation resistance of the laminate suffers as a result. Preventing thermal degradation is therefore key in obtaining a good performance as a canmaking material.

It should be noted that the polyolefin layer should comprise at least one adhesion layer comprising a bonding resin such as an acid or anhydride functionalised polyolefin containing carboxylic acid or anhydride groups, or an olefin copolymer containing carboxylic acid or anhydride groups. The layer comprising the bonding resin is in contact with the metal substrate in the laminate. The adhesion layer may be applied separately, or already be part of a polymer coating system obtained, e.g., by co-extrusion.

In an embodiment of the invention the first polymer coating layer comprises or consists of polyethylene, polypropylene, or copolymers of ethylene and propylene, or blends of polyethylene and polypropylene and/or wherein the second polymer coating layer comprises or consists of polyethylene, polypropylene, or copolymers of ethylene and propylene, or blends of polyethylene and polypropylene. The flow behaviour of these polyolefins is greatly stimulated by the high post-heat temperature allowable in the process according to the invention without risk of thermal degradation. Again a layer with a bonding resin may be present. In this particular embodiment of the invention, a post-heat-temperature of at least 220° C. is desired to stimulate the flow behaviour, rather than to reduce the crystallinity of the second polymer coating layer. If the post-heat were to be performed in a conventional atmosphere, the high temperatures would result in severe thermal degradation of both the first and the second polymer coating layer. So this is a second advantage of the same invention.

In a preferred embodiment the second polymer coating layer comprises or consists of a thermoplastic polymer with a melting point above 200° C. Examples of these coating layers comprise or consist of an aromatic polyester, such as poly(ethylene terephthalate), poly(trimethylene terephthalate), poly(butylene terephthalate), poly(ethylene naphthalate) and poly(butylene naphthalate); acid-modified poly(ethylene terephthalate) copolyesters comprising isophthalate; glycol-modified poly(ethylene terephthalate) copolyesters comprising cyclohexanedimethanol, 2,2,4,4-tetramethyl-1,3-cyclobutanediol or isosorbide; and blends comprising two or more of the above listed homo- or copolymers. Further examples of the coating layers having a melting point above 200° C. comprise or consist of certain polyamides, including polycaprolactam (polyamide-6), poly(hexamethylene adipamide) (polyamide-6,6), poly(tetramethylene adipamide) (polyamide-4,6), poly(hexamethylene dodecanoamide) (polyamide-6,12), poly(m-xylylene adipamide) (MXD6), and blends thereof.

The difference between the melting points of the polymer layer on the one major side and on the other major side of the metal strip are now significantly larger, and the method according to the invention allows the second polymer coating layer to be heated to above the melting point thereof without thermal degradation of the first polymer coating layer, but also mitigates any risk to the second polymer coating layer.

In an embodiment of the invention the polymer coating layers are applied as follows:
a. the laminate is produced by pressing the first and second polymer coating layer film onto the metal strip by means of laminating rolls wherein a laminating pressure is exerted on the laminate in the nip between the laminating rolls, or.
b. the laminate is produced by extruding the first and second polymer coating layer onto the metal strip, optionally followed by a lamination step using laminating rolls wherein a laminating pressure is exerted on the extruded polymer coating layers in the nip between the laminating rolls, or
c. one side of the laminate is produced by means according to the process of step a. and the other side of the laminate is produced by means according to the process of step b.

In an embodiment of the invention the non-oxidising gas atmosphere consists of an inert gas, such as nitrogen, with at most 1 vol. % of oxygen. At this level, the degree of thermal degradation is already much reduced. Preferably the oxygen content is lower to avoid the interaction between the oxygen and the polymers. So preferably the oxygen content in the inert gas is 0.5 vol. %, more preferably 0.25 vol. %, and even more preferably 0.1 vol. % (1000 ppm). Maintaining a non-oxidising gas atmosphere requires an installation and a great deal of proper maintenance. The lower the oxygen content, the higher the costs. A balance must be struck between these costs and the resulting quality of the laminate.

In an embodiment of the invention wherein the metal strip is a steel strip for producing a packaging (e.g. cans, containers) thereof, such as tinplate, blackplate, ECCS (TFS) or a steel substrate provided with a Cr-CrOx coating layer prior to application of the polymer coating. The process according to the invention can also be used to produce laminates for non-packaging applications, such as furniture, wall panels, etc.

In another embodiment of the invention the second polymer coating layer comprises or consists of an aliphatic thermoplastic polyester, such as polylactic acid or polylactide (PLA), polyhydroxyalkanoate (PHA) such as polyhydroxybutyrate, polyhydroxyvalerate and poly(hydroxybutyrate-co-3-hydroxyvalerate), polycaprolactone (PCL). These polymers have a low melting point and are also susceptible to thermal degradation. The non-oxidising atmosphere offers protection against this thermal degradation.

The high post-heat temperature may cause the metal substrate, in particular the steel substrate, to age. This ageing process causes the mechanical properties to change and this happens more quickly the higher the temperature is. Temperatures of 220° C. or higher are likely to cause ageing in steel grades that contain free carbon and or nitrogen in the matrix, such as low carbon steels or extra low carbon steels. Upon forming these aged substrates into a packaging application, Luders' lines may develop. Luders' lines are elongated surface markings or depressions, often visible with the unaided eye, that form along the length of a specimen at an angle of approximately 45° to the loading axis.

Caused by localized plastic deformation, they result from discontinuous (inhomogeneous) yielding. These Luders' lines are aesthetically unattractive and have to be avoided on finished products. In an embodiment of the invention the laminate (i.e. after coating with the polymer layers) is further processed by subjecting the laminate to a stretching operation wherein the stretching operation is achieved by:
a. passing the material through a temper mill and applying a thickness reduction between 0-3%, preferably of at least 0.2%; or by
b. passing the material through a stretcher-leveller.

The inventors surprisingly found that, contrary to the conventional processes in which the substrate is temper rolled or stretcher-leveled before the polymer coating is applied to the substrate, the substrate can be temper rolled or stretcher-levelled while the substrate is already coated with the polymer coating. The process according to the invention eliminates the risk of the discontinuous yield phenomena returning or occurring as a result of the post-heat of the laminate. The stretching operation has no deleterious effects on the polymer coating itself, nor on the adhesion thereof to the substrate. No cracking or damage occurs.

The steel strip may be blackplate, tinplate, ECCS or TFS Blackplate is the basic component of tinplate and ECCS: a sheet or strip of steel without coating. It can be used as such, or covered with metallic or organic coatings. A surface treatment may be needed to activate the surface of the metal strip just prior to the lamination. Tinplate is a thin sheet or strip of soft steel coated electrolytically on both sides with a tin layer. Chromium coated steel is a sheet or strip of steel electrolytically coated with a thin layer of chromium. Originally called TFS (Tin Free Steel), it is now known by the acronym, ECCS (Electrolytic Chromium Coated Steel). The chromium content of the coating on ECCS is preferably between 50 and 150 mg/m$^2$, and preferably between 70 and 110 mg/m$^2$. Organic coatings generally have excellent adhesive properties on ECCS and are therefore used particularly for plated cans and standard food can bottoms. The steel substrate may also comprise of a substrate coated in accordance with WO2012/045791 (FeSn), WO2014/079909 (Tinplate with a Cr-CrOx-layer) or WO2014/079910 (blackplate with a Cr-CrOx-layer). The chromium content of the Cr-CrOx-layer is preferably at least 50 mg/m$^2$, and preferably at least 100 mg/m$^2$, and preferably at most 200 mg/m$^2$.

Preferably the steel substrate is a carbon steel, preferably a low carbon steel, extra-low carbon steel, ultra low-carbon steel or a HSLA-steel. The thickness of the steel substrate is usually between 0.10 and 0.49 mm. These unalloyed (ULC, LC and ELC) or micro-alloyed (HSLA) steels are relatively cheap substrates and provide good strength and formability. The steels are produced by means of commonly known processes such as casting, hot-rolling and cold-rolling. Low carbon steels typically comprise 0.05 to 0.15 wt. % C and extra low carbon steels typically comprise 0.02 to 0.05 wt. % C. Ultra Low Carbon steels comprise typically below 0.01 wt. % C. Other elements may be present in addition to carbon in accordance with EN 10020-2000 which prescribes how much of a certain element may be present to still be considered unalloyed steel.

According to a second aspect the invention is also embodied in a laminate produced according to the invention and in a product produced from the laminate according to the invention. These products may be a packaging, such as a can, or a container, or a non-packaging product such as a panel. These products are different from those of the state of the art in that they have been post-heated at a higher temperature, and this in that they have a better performance and improved coating properties in terms of porosity (lower) and sterilisation resistance (higher) as compared to the prior art laminates. This is the direct result of the absence of thermal degradation in the method according to the invention. This difference between prior art and the inventive product is clearly demonstrated in the examples, and in particular in FIGS. 2 and 3.

In an embodiment a laminate is provided with a first thermoplastic polymer coating layer on one major surface of the strip and a second thermoplastic polymer coating layer on the other major surface of the strip wherein the first thermoplastic polymer coating layer comprises or consists of a polyolefin, and wherein the second polymer coating layer comprises or consists of an aromatic polyester, wherein the degree of crystallinity of the polyester is at most 20 wt. %, preferably at most 15 wt. %, more preferably at most 10 wt. %, and
  wherein the porosity of the polyolefin coating layer is 1 mA or lower, and/or
  wherein the ratio (Mw, after postheat/Mw, before postheat) is at least 0.9, preferably at least 0.93, more preferably at least 0.95.

Laminates which have not been produced according to the process of the invention either show significant porosity when being annealed at temperatures above 220° C., and a large degree of thermal degradation, which can be clearly observed when looking at the ratio (Mw, after postheat/Mw, before postheat) which can be as low as 0.1, or they show too high crystallinity of the polyester (see e.g. Table 4).

The invention is now further explained by means of the following, non limiting examples.

In the following examples, an ECCS strip is used, which is provided with a coating layer of metallic chromium and a layer of chromium oxide on both sides, and wherein the total amount of chromium in the coating on each side is approximately 90 mg/m$^2$. It is noted that the invention works equally well on the metal strip as produced by the process of WO2014079910-A1.

One side of the metal strip is coated with a polyester (PET) film. This is a commercially available PET film denoted Hostaphan® RHSL20, provided by Mitsubishi Polyester Film GmbH. RHSL20 is a biaxially oriented polyester film with high crystallinity and a thickness of 20 μm.

The other side of the strip is coated with a three-layer polypropylene (PP) film. The film is obtained in a cast film process using three separate extruders that each feed a specific polymer composition into a feedblock and die. The extruded film has an A/B/C layer structure which a ratio of layer thickness A:B:C=4:17:4 and is cast at 160 m/min to give a final overall thickness of 25 μm. Two different film compositions were used in the present examples, denoted PP1 and PP2 respectively, as described in Table 1.

TABLE 1

PP film compositions used in the present examples (% in wt. %)

| Film | A layer | B layer | C layer |
|---|---|---|---|
| PP1 | 100% Resin 1 | 100% Resin 2 | 98% Resin 2 |
|  |  |  | 2% Additive 2 |
| PP2 | 100% Resin 1 | 97% Resin 2 | 97% Resin 2 |
|  |  | 3% Additive 1 | 3% Additive 1 |
|  |  |  | 2% Additive 2 |

Resin 1 is a maleic anhydride modified PP resin denoted Toyo-Tac M-100, commercially available from Toyobo Co., Ltd. (MFI = 7.0 g/10 min*)
Resin 2 is a isotactic PP homopolymer denoted PPH7060, commercially available from Total Petrochemicals (MFI = 12 g/10 min*)
Additive 1 is a master batch containing an anti-oxidant, product designation T8823AO from A. Schulman, Inc. (MFI = 5.0 g/10 min*)
Additive 2 is a master batch containing an anti-block additive, product designation ABPP10 from A. Schulman, Inc. (MFI = 5.0 g/10 min*)
*MFI = melt flow index, according to ISO1133 at 230° C./2.16 kg As can be seen from Table 1, the main difference between the two films is that film PP2 contains an anti-oxidant additive while film PP1 does not. The PP films are laminated to the steel strip in such a way that the side of the film corresponding to the A layer is in contact with the steel surface after laminating.

The PET and PP films are laminated to the steel strip by a process schematically shown in FIG. 1. The metal strip (1) is passed through a first heating device (2) where the temperature of the metal strip is raised to a value suitable for lamination, T1. In the present examples T1 was chosen to be 190° C. but this temperature may be varied over a wide range depending on the product that is made. A PET film coil (3a) and a PP film coil (3b) are simultaneously unwound and passed, together with the pre-heated metal strip, through a pair of laminating rollers (4a, 4b). The laminated product (5) is passed through a second heating device (the post-heat 6) which can be purged and filled by a gas atmosphere (7). In the present examples, air and nitrogen were used as gas atmosphere for the second heating device. After the post-heat device, the laminated product is rapidly cooled by a quenching device (8, not shown) such as a tank filled with cold water. The method of pre-heating the metal strip in the first heating device is not particularly limited and may include passing the strip over heated rolls, conductive heating, inductive heating, radiative heating etc. The method of post-heating the laminated product in the second heating device is preferably a contactless method, such as heating in a hot gas environment or inductive heating.

In order to demonstrate the present invention, experiments were conducted using various settings as outlined in Table 2. In all cases, one side of the strip was laminated with PET film RHSL20, while the opposite side of the strip was laminated with a PP film, being either PP1 or PP2 as outlined above. Post-heating of the laminated product in the second heating device was done under two different types of gas atmosphere, air and nitrogen containing less than 0.1 vol. % oxygen, respectively. The temperature T2 of the post heat treatment in the second heating device was chosen to be either 200° C., which is below the melting point of the polyester film, or 280° C., which is above the melting point of the polyester film.

TABLE 2

Process conditions used in the present examples

| Example | Film type | Atmosphere | T2 (° C.) |
|---|---|---|---|
| Comparative Example 1 | PP1 | Air (O$_2$ = 21%) | 200 |
| Comparative Example 2 | PP1 | Air (O$_2$ = 21%) | 280 |
| Comparative Example 3 | PP2 | Air (O$_2$ = 21%) | 200 |
| Comparative Example 4 | PP2 | Air (O$_2$ = 21%) | 280 |
| Example 1 | PP1 | N$_2$ (O$_2$ = 0.08%) | 200 |
| Example 2 | PP1 | N$_2$ (O$_2$ = 0.08%) | 280 |
| Example 3 | PP2 | N$_2$ (O$_2$ = 0.08%) | 200 |
| Example 4 | PP2 | N$_2$ (O$_2$ = 0.08%) | 280 |

The finished metal-polymer laminates were characterised by the methods outlined below. For some methods, it is necessary to analyse the free-standing coating film liberated from the metal substrate. Free-standing coating films were obtained by placing a panel of the finished metal-polymer laminate in hydrochloric acid at a concentration of 18% HCl to dissolve the metal substrate. After dissolution of the metal substrate, the coating films were rinsed thoroughly and dried.

Crystallinity of the polyester coating: In order to achieve the desired product properties for the metal-polymer laminate, such as adhesion, formability and appearance, it is important that the polyester coating is essentially amorphous, more specifically that the polyester coating has a crystallinity value which is lower than 10 wt. %. The crystallinity of the polyester coating is determined by differential scanning calorimetry (DSC) performed using a Mettler Toledo DSC821e instrument. DSC samples are prepared by placing a portion of the free-standing polymer film of about 4-10 mg in weight in a 40 μL aluminium sample pan. DSC thermograms are recorded by heating the sample from −10° C. to 300° C. at a heating rate of 10° C./min. A typical DSC spectrum obtained in this way shows a (exothermic) recrystallisation peak at temperatures between 80 and 130° C. and a (endothermic) melting peak at temperatures between 240 and 260° C. The crystallinity X of the polyester film is then calculated from:

$$X = \frac{|\Delta H_m| - |\Delta H_r|}{\Delta H_0} \times 100\%$$

where $\Delta H_r$ and $\Delta H_m$ correspond to the respective areas under the recrystallisation and melting peaks (i.e. the heats of recrystallisation and melting, respectively) and $\Delta H_0$ is the heat of fusion of the perfectly crystalline polymer. A value of $\Delta H_0$=115 J/g for PET is used in this calculation (see "Polymer Handbook", J. Brandrup, E. H. Immergut and E. A. Grulke eds., Wiley Interscience, 4th ed (1999), Section VI, Table 7).

Molecular Weight of the PP Coating:

To determine the molecular weight and molecular weight distribution of the PP coating after various process conditions, the free-standing PP films were subjected to analysis by Size Exclusion Chromatography (SEC). The SEC analysis was performed using a Polymer Laboratories PL-GPC220 chromatograph equipped with PL BV-400 viscometer, refractive index detector and Polymer Char IR5 infrared detector. Linear polyethylene (PE) standards were used for calibration of the system. A PP molar mass calibration was obtained after conversion from PE to PP using the Mark-Houwink constants of PE and PP. The result of the SEC analyses is given in terms of the number-average molecular weight (Mn) and weight-average molecular weight (Mw) of the PP coating, expressed as kg/mol.

Porosity of the PP Coating:

Porosity of the PP coating in the metal-polymer laminate was determined by means of an electrochemical porosity test. For this test, a 5 mm Erichsen dome is applied to the metal-polymer laminate, in such a way that the PP coating is on the convex side of the dome. The sample is placed in an electrolytic cell with the convex side of the dome being inside the cell, and the metal base is connected as the anode. The cell is filled with an aqueous solution containing 20 g/l anhydrous sodium sulphate and 0.25 g/l dioctyl sodium sulfosuccinate ($C_{20}H_{37}NaO_7S$, CAS 577-11-7) and a stainless steel counter-electrode (cathode) is subsequently placed in the solution opposite the sample. The exposed surface area of the sample is 12.5 $cm^2$. A direct current of 6.3 V is applied during 4 seconds and the electric current is recorded. The sample passes the test if the electric current remains below 1 mA.

Sterilisation Resistance of the PP Coating:

For this test, a series of beads with a bending radius of about 1 mm is applied to a sample of the metal-polymer laminate in such a way that the PP coating side of the sample corresponds to the convex side of the bead. The sample is placed in an aqueous solution containing 1% by volume of acetic acid in a closed container and subsequently sterilised at 120° C. during 60 min. After sterilisation, the samples are cooled, rinsed and dried and the beaded area of the PP coated side of the sample is visually inspected with the aid of a 10× magnifying glass. The extent of corrosion is expressed by a rating system that characterises the amount and size of blisters and/or corrosion spots on the sample after sterilisation, as outlined in Table 3.

TABLE 3

Rating system to characterise the extent of corrosion after sterilisation

| Rating | Amount of blisters (% of area covered) | Size of blisters |
|---|---|---|
| 0 | None | No blisters |
| 1 | Very few (<0.1%) | Not visible by naked eye, <0.2 mm |
| 2 | <1% | Visible by naked eye, <0.2 mm |
| 3 | <5% | 0.2-0.5 mm |
| 4 | <40% | 0.5-5 mm |
| 5 | >40% | >5 mm |

Results for Comparative Examples 1 through 4, where air is used a gas medium during the post-heating step of the lamination process, are given in Table 4. Results for Inventive Examples 1 through 4 of the present invention, where nitrogen is used a gas medium during the post-heating step of the lamination process, are given in Table 5. As can be seen from Comparative Examples 1 and 3, post-heating at T2=200° C. in air atmosphere results in PP coatings having a sufficiently high molecular weight with Mn of about 50 kg/mol and Mw of about 250 kg/mol. The performance of these PP coatings in terms of porosity and sterilisation resistance is excellent. However, the crystallinity of the PET coatings is very high, more than 40 wt. % in all cases, while a crystallinity value below 10 wt. % is required to achieve the proper adhesion, formability and appearance of the final polymer-coated product. Therefore, these process settings lead to an unacceptable overall product quality of the PET/PP-coated product.

By raising the post-heat temperature above the melting point of the PET coating, i.e. T2=280° C. as in Comparative Examples 2 and 4, the PET coating is indeed fully remelted and rendered essentially amorphous with crystallinity values which are clearly below 10 wt. %. Comparative Examples 2 and 4 show that, when such a post-heat step is conducted in air, as is the common practice, strong thermal degradation of the PP coating occurs. There is a pronounced decrease molecular weight of the polymer to Mn values of 5 kg/mol or less and Mw values of 26 kg/mol or less. The porosity values of the coating increase dramatically to several tens or even hundreds of mA. The sterilisation performance in acetic acid is extremely poor with more than 40% of the surface covered in large blisters. The pronounced degradation of the PP coating is not alleviated in a noticeable way by the use of an anti-oxidant in the PP film recipe (film PP2, Comparative Example 4).

When conducting the high-temperature post-heat treatment at T2=280° C. under an inert gas atmosphere consistent with the present invention (Inventive Examples 2 and 4), no appreciable molecular degradation of the PP coating occurs. In these Examples, the molecular weight of the PP coating corresponds to Mn=50 kg/mol or more and Mw=240 kg/mol or more, i.e. comparable to the molecular weight of the PP coatings after heating at the much lower T2 temperature of 200° C. (either in air or in nitrogen atmosphere). It is seen that the performance of the PP coatings in these Examples is excellent, with zero porosity value and very good sterilisation resistance in acetic acid. Due to the high T2 temperature, the PET coating is fully remelted and rendered essentially amorphous with crystallinity values which are clearly below 10 wt. %.

Figure 2:
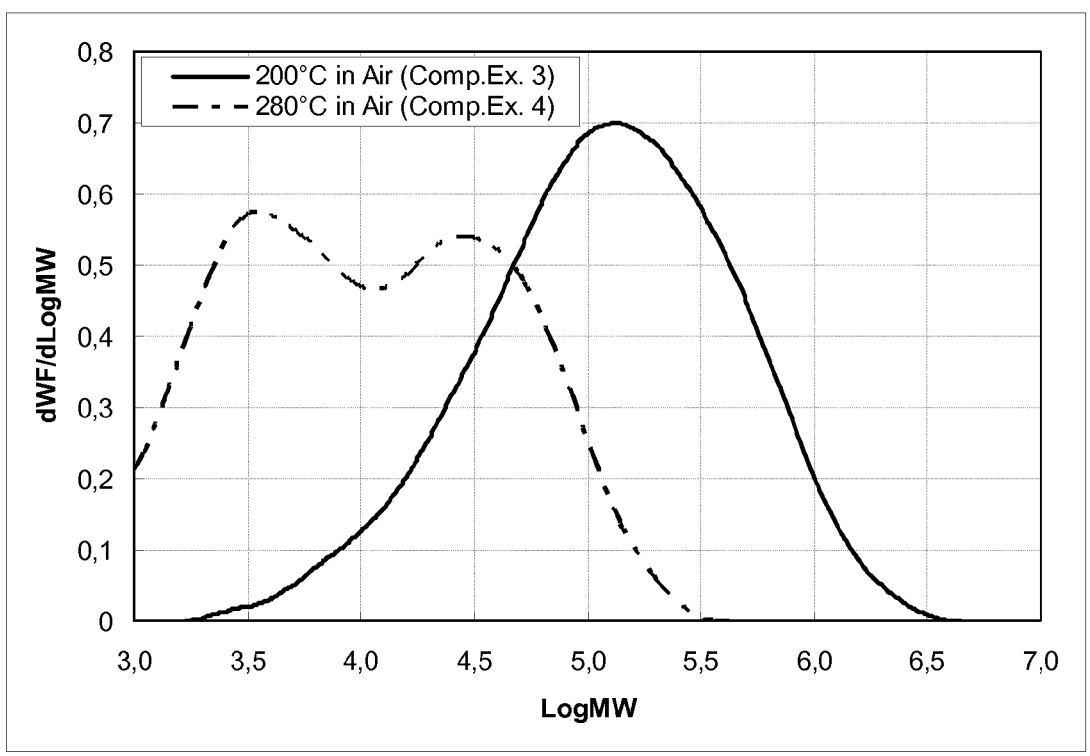
FIG. 2 shows a molecular weight distribution of a PP coating after post-heat treatment in air at 200° C. and 280° C. respectively.
Figure 3:
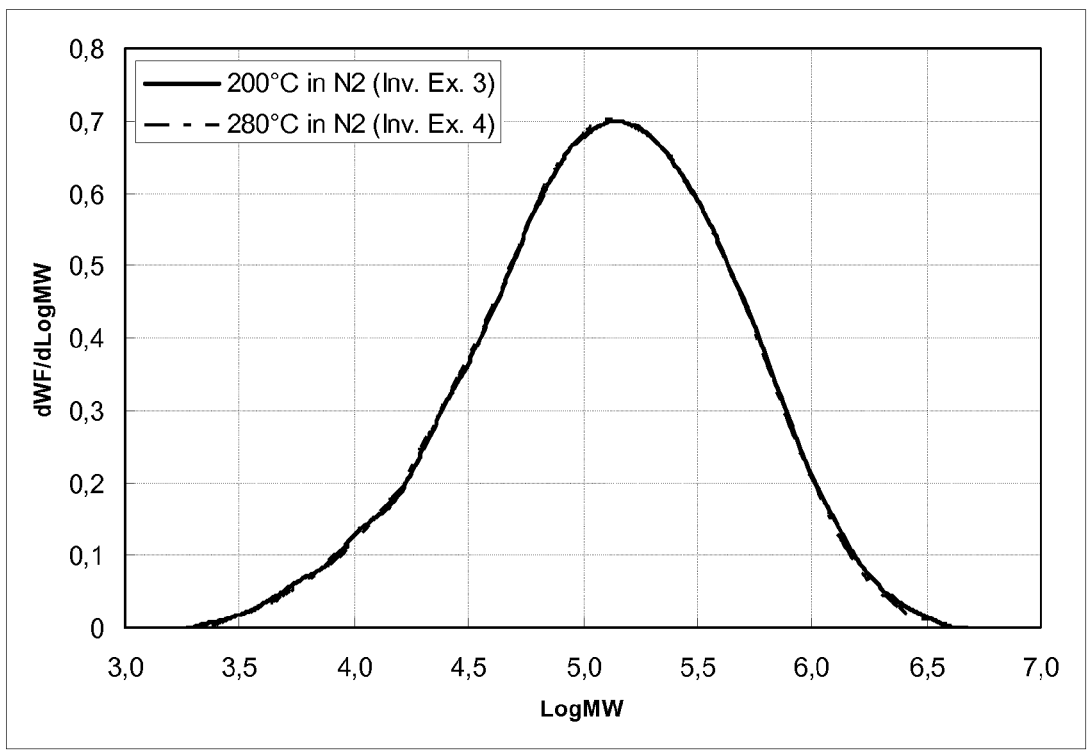
FIG. 3 shows the molecular weight distribution of the PP coating after post-heat treatment in nitrogen atmosphere containing less than 0.1 vol.% oxygen at 200° C. and 280° C. respectively.

The effect of the gas atmosphere used during post-heat treatment on the molecular weight and molecular weight distribution of the PP coating is illustrated in FIGS. 2 and 3.

In conclusion, applying an inert gas atmosphere during high-temperature post-heat treatment leads to a favourable combination of coating properties including an essentially amorphous PET coating in combination with a PP coating in which the molecular weight is retained and which shows excellent coating properties in terms of porosity and sterilisation resistance. The use of the inert gas atmosphere provides a very broad processing window for post-heating PET/PP dual coated products and puts no restriction on the coating formulation of either the PET or the PP coating.

TABLE 4

| | Comparative Examples | | | |
|---|---|---|---|---|
| | Comparative Example 1 | Comparative Example 2 | Comparative Example 3 | Comparative Example 4 |
| Film type | PP1 | PP1 | PP2 | PP2 |
| Atmosphere | Air | Air | Air | Air |
| T2 (° C.) | 200 | 280 | 200 | 280 |
| X PET (wt. %) | 45.8 | 7.1 | 44.8 | 7.5 |
| Mn PP (kg/mol) | 53 | 4 | 50 | 5 |
| Mw PP (kg/mol) | 250 | 22 | 250 | 26 |
| Porosity PP (mA) | 0.003 | 203 | 0.000 | 22 |
| Acetic acid sterilisation: | | | | |
| amount of blisters | 2 | 5 | 1 | 5 |
| size of blisters | 1 | 2 | 1 | 3 |

TABLE 5

Examples of the present invention

|  | Inventive Example 1 | Inventive Example 2 | Inventive Example 3 | Inventive Example 4 |
|---|---|---|---|---|
| Film type | PP1 | PP1 | PP2 | PP2 |
| Atmosphere | $N_2$ ($O_2 < 0.08\%$) | $N_2$ ($O_2 < 0.08\%$) | $N_2$ ($O_2 < 0.08\%$) | $N_2$ ($O_2 < 0.08\%$) |
| T2 (° C.) | 200 | 280 | 200 | 280 |
| X PET (wt. %) | 44.7 | 8.3 | 48.9 | 3.3 |
| Mn PP (kg/mol) | 53 | 50 | 53 | 53 |
| Mw PP (kg/mol) | 250 | 240 | 260 | 250 |
| Porosity PP (mA) | 0.000 | 0.000 | 0.000 | 0.000 |
| Acetic acid sterilisation: |  |  |  |  |
| amount of blisters | 2 | 2 | 1 | 1 |
| size of blisters | 1 | 1 | 1 | 1 |

In FIG. 2 the molecular weight distribution of the PP coating after post-heat treatment in air at 200° C. and 280° C. respectively is shown. Film type PP2 contains an anti-oxidant. In FIG. 3 the molecular weight distribution of the PP coating after post-heat treatment in nitrogen atmosphere containing less than 0.1 vol. % oxygen at 200° C. and 280° C. respectively is shown. Film type PP2 contains an anti-oxidant. In FIG. 4 (taken from the brochure "Steel for packaging applications—Product range & technical specifications" by Tata Steel (www.tatasteeleurope.com) various types of packaging steels according to the standards are presented. These steels can all be used as metal strip in the invention.

The invention claimed is:

1. A process for producing a laminate in a coating line comprising the subsequent steps of:
   providing a metal strip;
   pre-heating the metal strip to a temperature of at least 100° C. suitable for lamination on one major surface of the strip with a first thermoplastic polymer coating layer which comprises a layer comprising polymer with a melting point below 200° C. and lamination on the other major surface of the strip with a second thermoplastic polymer coating layer;
   producing a laminate by adhering the first thermoplastic polymer coating layer on the one major surface of the pre-heated strip and the second thermoplastic polymer coating layer on the other major surface of the pre-heated strip, wherein the first thermoplastic polymer coating layer comprises the polymer with a melting point below 200° C.;
   heating the laminate in a non-oxidising gas atmosphere in a post-heating step to temperature that is at least the melting point of the polymer or polymers in the second polymer coating layer but no less than 220° C.;
   rapidly cooling or quenching the laminate to a temperature of below 50° C.

2. The process according to claim 1, wherein the first polymer coating layer comprises a polyolefin layer or layers, or wherein the first and second polymer coating layers comprises a polyolefin layer or layers.

3. The process according to claim 1, wherein the first polymer coating layer comprises polyethylene, polypropylene, or copolymers of ethylene and propylene, or blends of polyethylene and polypropylene and/or wherein the second polymer coating layer comprises polyethylene, polypropylene, or copolymers of ethylene and propylene, or blends of polyethylene and polypropylene.

4. The process according to claim 1, wherein the second polymer coating layer comprises a thermoplastic polymer with a melting point above 200° C.

5. The process according to claim 4, wherein the second polymer coating layer comprises an aromatic polyester selected from the group consisting of poly(ethylene terephthalate), poly(trimethylene terephthalate), poly(butylene terephthalate), poly(ethylene naphthalate) and poly(butylene naphthalate); acid-modified poly(ethylene terephthalate) copolyesters comprising isophthalate; glycol-modified poly (ethylene terephthalate) copolyesters comprising cyclohexanedimethanol, 2,2,4,4-tetramethyl-1,3-cyclobutanediol or isosorbide; and
   blends comprising two or more of the above listed homo- or copolymers.

6. The process according to claim 4, wherein the second polymer coating layer comprises a polyamide selected from the group consisting of polycaprolactam (polyamide-6), poly(hexamethylene adipamide) (polyamide-6,6), poly(tetramethylene adipamide) (polyamide-4,6), poly(hexamethylene dodecanoamide) (polyamide-6,12), poly(m-xylylene adipamide) (MXD6), and blends thereof.

7. The process according to claim 1, wherein the second polymer coating layer comprises an aliphatic thermoplastic polyester selected from the group consisting of polylactic acid or polylactide (PLA), polyhydroxyalkanoate (PHA), polyhydroxybutyrate, polyhydroxyvalerate and poly(hydroxybutyrate-co-3-hydroxyvalerate), and polycaprolactone (PCL).

8. The process according to claim 1, wherein:
   a. the laminate is produced by pressing the first and second polymer coating layer film onto the metal strip by means of laminating rolls wherein a laminating pressure is exerted on the laminate in the nip between the laminating rolls, or
   b. the laminate is produced by extruding the first and second polymer coating layer onto the metal strip, optionally followed by a lamination step using laminating rolls wherein a laminating pressure is exerted on the extruded polymer coating layers in the nip between the laminating rolls, or
   c. one side of the laminate is produced by means according to the process of step a. and the other side of the laminate is produced by means according to the process of step b.

9. The process according to claim 1, wherein the non-oxidising gas atmosphere consists of an inert gas with at most 1 vol. % (10000 ppm) of oxygen.

10. The process according to claim 1, wherein the metal strip is a steel strip for producing packaging thereof selected from the group consisting of tinplate, blackplate, ECCS (TFS) or a steel substrate provided with a Cr-CrOx coating layer prior to application of the polymer coating.

11. The process according to claim 1, wherein the laminate is further processed by subjecting the laminate to a stretching operation wherein the stretching operation is achieved by:
  a. passing the material through a temper mill and applying a thickness reduction in a range of greater than 0 to less than 3%; or by
  b. passing the material through a stretcher-leveller.

12. A laminate produced according to a process for producing the laminate in a coating line comprising the subsequent steps of:
  providing a metal strip;
  pre-heating the metal strip to a temperature of at least 100° C. suitable for lamination on one major surface of the strip with a first thermoplastic polymer coating layer which comprises a layer comprising polymer with a melting point below 200° C. and lamination on the other major surface of the strip with a second thermoplastic polymer coating layer;
  producing a laminate by adhering the first thermoplastic polymer coating layer on the one major surface of the pre-heated strip and the second thermoplastic polymer coating layer on the other major surface of the pre-heated strip, wherein the first thermoplastic polymer coating layer comprises the polymer with a melting point below 200° C.;
  heating the laminate in a non-oxidising gas atmosphere in a post-heating step to temperature that is at least the melting point of the polymer or polymers in the second polymer coating layer but no less than 220° C.;
  rapidly cooling or quenching the laminate to a temperature of below 50° C.,
  wherein the first polymer coating layer comprises a polyolefin with the melting point below 200° C. selected from polyethylene, polypropylene, or copolymers of ethylene and propylene, or blends of polyethylene and polypropylene;
  wherein the second polymer coating layer comprises a thermoplastic polymer with the melting point above 200° C., and
    a crystallinity of less than 20 wt. % after said heating of the laminate in a non-oxidising gas atmosphere in a post-heating step to the temperature that is at least the melting point of the polymer or polymers in the second polymer coating layer but no less than 220° C. and said rapidly cooling or quenching the laminate to the temperature of below 50° C. the second polymer coating layer, and
      which is selected from the group consisting of an aromatic polyester; acid-modified poly(ethylene terephthalate) copolyesters comprising isophthalate;
  glycol-modified poly(ethylene terephthalate) copolyesters comprising cyclohexanedimethanol, 2,2,4,4-tetramethyl-1,3-cyclobutanediol or isosorbide;
  and blends comprising two or more of the above listed homo- or copolymers,
  wherein the second thermoplastic polymer coating layer has a higher melting point than the first thermoplastic polymer coating layer,
  wherein said aromatic polyester is selected from the group consisting of poly(ethylene terephthalate), poly(trimethylene terephthalate), poly(butylene terephthalate), poly(ethylene naphthalate) and poly(butylene naphthalate); and
    wherein the ratio Mw, after postheat/Mw, before postheat of the polyolefin coating layer is at least 0.9.

13. The laminate produced according to the process according to claim 1,
  wherein the laminate is provided with a first thermoplastic polymer coating layer on one major surface of the strip and a second thermoplastic polymer coating layer on the other major surface of the strip,
  wherein the first thermoplastic polymer coating layer comprises a polyolefin, wherein the polyolefin comprises polyethylene, polypropylene, or copolymers of ethylene and propylene, or blends of polyethylene and polypropylene; and
  wherein the second polymer coating layer comprises an aromatic polyester, wherein the degree of crystallinity of the polyester is at most 10 wt. % after said heating of the laminate in a non-oxidising gas atmosphere in a post-heating step to the temperature that is at least the melting point of the polymer or polymers in the second polymer coating layer but no less than 220° C. and rapidly cooling or quenching the laminate to the temperature of below 50° C. the second polymer coating layer,
  wherein the second polymer coating layer aromatic polyester has a melting point above 200° C.;
  wherein said aromatic polyester is selected from the group consisting of poly(ethylene terephthalate), poly(trimethylene terephthalate), poly(butylene terephthalate), poly(ethylene naphthalate) and poly(butylene naphthalate), and
    wherein the porosity of the polyolefin coating layer is 1 mA or lower, and/or
    wherein the ratio Mw, after postheat/Mw, before postheat of the polyolefin coating layer is at least 0.9.

14. The laminate produced according to the process according to claim 11,
  wherein the first polymer coating layer comprises polyethylene, polypropylene, or copolymers of ethylene and propylene, or blends of polyethylene and polypropylene;
  wherein the second polymer coating layer comprises a thermoplastic polymer with a melting point above 200° C. selected from the group consisting of an aromatic polyester; acid-modified poly(ethylene terephthalate) copolyesters comprising isophthalate; glycol-modified poly(ethylene terephthalate) copolyesters comprising cyclohexanedimethanol, 2,2,4,4-tetramethyl-1,3-cyclobutanediol or isosorbide; and
  blends comprising two or more of the above listed homo- or copolymers,
  wherein said aromatic polyester is selected from the group consisting of poly(ethylene terephthalate), poly(trimethylene terephthalate), poly(butylene terephthalate), poly(ethylene naphthalate) and poly(butylene naphthalate),
  wherein the laminate is free from yield point elongation.

15. A can or container comprising the laminate according to claim 12.

16. The process according to claim 11, wherein the stretching operation is achieved by:
  a. passing the material through the temper mill and applying the thickness reduction of at least 0.2%; or by
  b. passing the material through the stretcher-leveller.

17. The laminate according to claim 13, wherein the degree of crystallinity of the polyester is at most 10 wt. %, and
  wherein the porosity of the polyolefin coating layer is 1 mA or lower and/or the ratio Mw, after postheat/Mw, before postheat is at least 0.93.

18. The laminate according to claim 13, wherein the degree of crystallinity of the polyester is at most 10 wt. %, and
 wherein the porosity of the polyolefin coating layer is 1 mA or lower and/or the ratio Mw, after postheat/Mw, before postheat is at least 0.95;
 wherein the heating of the laminate in the non-oxidising gas atmosphere in the post-heating step was to temperature that is at least 260° C.

19. The laminate according to claim 12, wherein the degree of crystallinity of the polyester is at most 15 wt. %, and
 wherein the porosity of the polyolefin coating layer is 1 mA or lower and/or the ratio Mw, after postheat/Mw, before postheat is at least 0.93;
 wherein the heating of the laminate in the non-oxidising gas atmosphere in the post-heating step was to temperature that is at least 260° C.

20. The laminate according to claim 18,
 wherein the second polymer coating layer comprises poly(ethylene terephthalate).

21. The laminate according to claim 19,
 wherein the second polymer coating layer comprises poly(ethylene terephthalate).

* * * * *